United States Patent

[11] 3,633,047

[72] Inventors Zaghloul Kadah
North Syracuse;
Gerard Rolland, Syracuse, both of N.Y.

[21] Appl. No. 775,231
[22] Filed Nov. 4, 1968
[45] Patented Jan. 4, 1972
[73] Assignee Syracuse Electronics Corporation
Syracuse, N.Y.

[54] DELAY-ON-MAKE SOLID-STATE CONTROLLER
2 Claims, 1 Drawing Fig.

[52] U.S. Cl. .......... 307/252 F, 307/252 K, 307/293, 307/301, 307/305
[51] Int. Cl. .......... H03k17/00, H03k 17/26
[50] Field of Search .......... 307/284, 305, 252, 301, 293

[56] References Cited

UNITED STATES PATENTS

| | | | |
|---|---|---|---|
| 3,181,009 | 4/1965 | Felcheck | 307/284 |
| 3,286,135 | 11/1966 | Hauer | 307/301 |
| 3,244,965 | 4/1966 | Gutzwiller | 307/301 |
| 3,307,093 | 2/1967 | Wright | 307/301 |
| 3,324,355 | 6/1967 | Gessner | 307/252 |

OTHER REFERENCES

G. E. Application Note, Triac, Galloway, 200.35- 3/66, pg. 16

G. E. Application Note, " The D13T- A Programmable Unijunction Transistor," Spofford, 11-67, pp. 1 & 2

Spofford, G. E. Application Note, 90.70, 11/67, The D13T- A Programmable Unijunction Transistor, pp. 2- 14

*Primary Examiner*—Donald D. Forrer
*Assistant Examiner*—David M. Carter
*Attorney*—F. P. Keiper

ABSTRACT: Delay-on-make solid-state controller circuit for series connection to a load, having a bridge rectifier circuit, a silicon-controlled rectifier connected across the bridge rectifier circuit output, a current-limiting resistor, a pair of divider resistors in series connected through the resistor to the rectifier, a variable resistance and capacitance connected in series, and connected in parallel with the divider resistances, a programmable unijunction connected to the midpoint of the resistance capacitance circuit, and through a resistance to the gate of the silicon-controlled rectifier, and a connection from the midpoint of the divider resistors, to the trigger of the unijunction, a capacitance connected between the trigger of the unijunction and the cathode of the silicon-controlled rectifier, a capacitance connected between the cathode of the rectifier and its gate, and a capacitance resistance circuit connected across the bridge output.

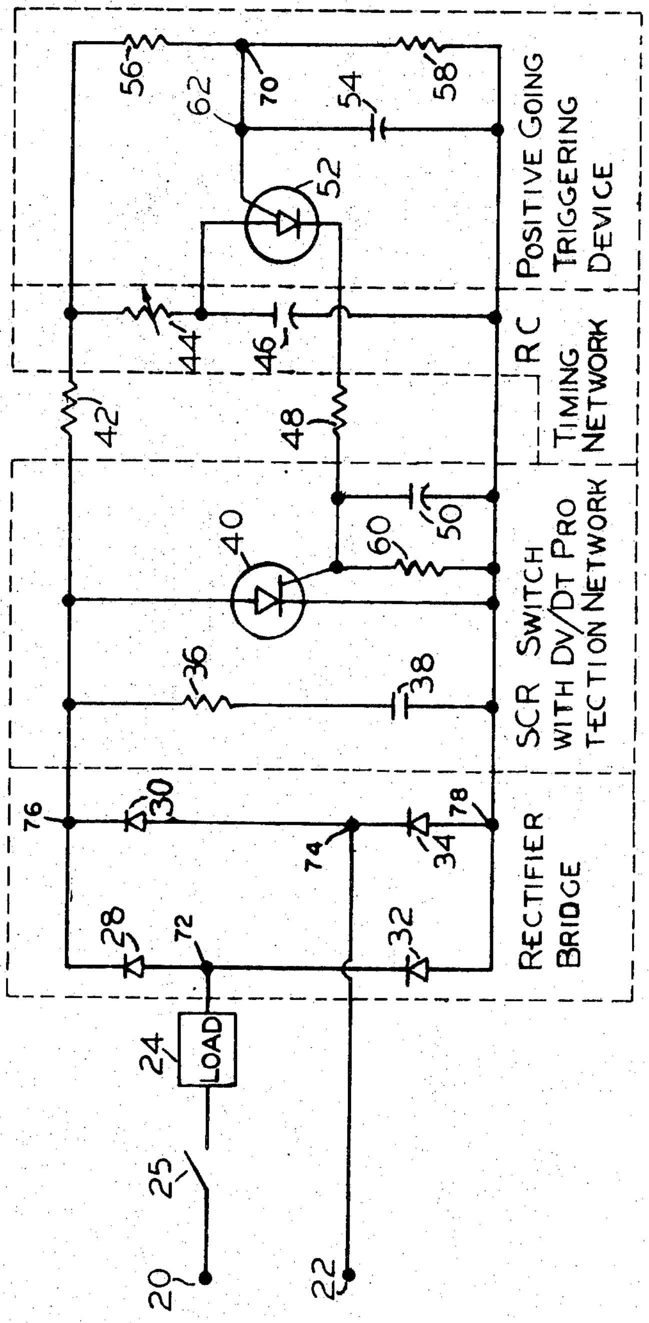
INVENTORS
ZAGHLOUL KADAH
GERARD ROLLAND
BY
ATTORNEY

DELAY-ON-MAKE SOLID-STATE CONTROLLER

This invention relates to a solid state delay on make switching circuit controller.

More particularly the invention relates to a circuit composed of four sections, a rectifier bridge assembly, switching with a high-gate sensitivity silicone-controlled rectifier, resistance capacitance timing network and a triggering network, that provides high reliability against line transients and false triggering, and includes a built-in holding current for the silicone-controlled rectifier, eliminating the need for an auxiliary circuit to provide for the holding current. The circuit also has a very high-input impedance that eliminates the need for a filter capacitor and power resistors thus leading itself easily to integration.

The controller is applicable where controlled time delay is required before applying power to such items as solenoids, relays, heaters, motors and any AC OR DC loads.

It is therefore an object of this invention to provide a reliable controller not affected by line transients.

It is another object of the invention to provide a two lead controller that can be easily connected in series with the load that it switches on.

It is yet another object of this invention to provide a circuit that lends itself easily to miniature package design.

The foregoing and other related objects, aspects, uses and advantages thereof, will clearly appear from the following description and from the accompanying drawing.

Referring to FIG. 1 wherein there is shown a rectifier bridge terminals 72 and 74 and rectified alternating current output terminals 76 and 78 composed of diodes 28, 30, 32 and 34, and silicone-controlled rectifier 40 with a resistance capacitance network 36 and 38 to protect against DV/DT, the rate of voltage rise. A capacitor 50 is connected between the gate and cathode of the silicone-controlled rectifier to protect against line transients and provide for the holding current. Resistor 42 is a voltage dropping resistor. Variable resistor 44 and capacitor 46 comprise a resistance capacitance timing network that may vary over a wide range. A positive going triggering device 52 with a capacitor 54 connected between the gate and cathode to protect against transients is provided. Voltage dividing resistors 56 and 58 establishing a voltage level at intermediate connection 70 and voltage at the gate connection 62 of the triggering device determine the voltage at which it will trigger.

A feature of the controller is that prior to triggering and switching the load on, the controller is not susceptible to false triggering due to line transients thus providing reliability. This is due to the resistance capacitance network 36 and 38 and the capacitor 50 between the gate and cathode of the silicone-controlled rectifier, which combined provides excellent protection to the silicone-controlled rectifier against high DV/DT that could otherwise trigger the silicone-controlled rectifier prematurely. It is also due to capacitor 54 which provides protection at the gate of the triggering device allowing the timing capacitor 46 to charge up to the prescribed voltage level before triggering.

The triggering device employed is a programmable unijunction transistor that will give a positive going pulse at the end of the adjustable time delay which is determined by the voltage level at the gate 62 of the transistor as established by the ratio of resistor 58 to resistors 56 and 58, and by the value of the variable resistor 44 and timing capacitor 46. Other considerations have to be given to leakage current of the capacitor 56 and the minimum triggering current requirement of the transistor 62. While a programmable unijunction transistor is preferred, many other triggering devices could be used such as neon lamps, trigger diodes, silicon bilateral and unilateral switches if desired.

A further feature of the controller is that once the silicone-controlled rectifier 40 is triggered on, it does not require an auxiliary network to provide for the holding current of the silicone-controlled rectifier. This is due to the capacitor 50 between the gate and cathode of the silicone-controlled rectifier. When the silicone-controlled rectifier triggers on, it charges up the capacitor 50 to the voltage drop of the silicone-controlled rectifier which is higher than the triggering voltage of the silicone-controlled rectifier. Thus when the line voltage drops to a point where there is not enough current to keep the silicone-controlled rectifier latched, the capacitor 50 will act as a voltage source and provide enough current to keep the silicone-controlled rectifier to keep it latched during commutation. The elimination of the auxiliary network mentioned above eliminates the need for a three wire lead controller.

Another feature of the controller is that it has very high-input impedance and thus consumes very little energy to operate. It also eliminates the need for an electrolytic filter capacitor. All the transistors in the controller are planar passivated devices. This permits the controller to be readily adapted to hybriding on a small substrate providing a miniature package design.

As an example, for use in connection with a 110-volt source, resistors 42, 56, and 58 could be in the order of 220, 65 and 100 thousand ohms respectively, and the capacitances 38, 50, 46 and 54 may be 0.2, 10.0, 20.0 and 0.001 microfarads respectively. The variable resistor 44 may have a range as high as 7.5 megohms, and the resistor 48 will be of suitable value to limit current to the triggering device. Resistor 60 may be typically 1.0 kilo-ohm.

While a single embodiment of the invention has been illustrated and described, it is to be understood that the invention is not limited thereto. As various changes in the construction, arrangement and values may be made without departing from the spirit of the invention, as will be apparent to those skilled in the art, reference will be had to the appended claims for a definition of the limits of the invention.

We claim:

1. A delay-on-make solid state controller circuit comprising a rectifier bridge adapted for load connections across the bridge and having rectified alternating current output connections, a series resistance capacitance net work, and a silicone-controlled rectifier connected in parallel across the output connections, said silicone-controlled rectifier having a latching capacitance connected across its gate and cathode, a series variable resistor capacitor circuit connected through a voltage dropping resistor to said output connections, and having a voltage divider resistance circuit connected in parallel with the variable resistor capacitor circuit, a programmable unijunction having its anode connected to the mid connection of said variable resistor capacitor circuit, its cathode connected through a current limiting resistor to the gate of the silicone-controlled rectifier, and its gate to the midconnection of said divider resistance circuit.

2. A circuit according to claim 1 having a capacitance connected across the gate of the unijunction and the cathode of said silicone-controlled rectifier.

* * * * *